(12) United States Patent
Eckert et al.

(10) Patent No.: US 9,994,203 B2
(45) Date of Patent: Jun. 12, 2018

(54) METHOD FOR THE TEMPERATURE-DEPENDENT CONTROL OF A PRESSURE CONTROL VALVE AND A CONTROL DEVICE THEREFORE

(71) Applicant: WABCO GmbH, Hannover (DE)

(72) Inventors: Horst Eckert, Rehburg-Loccum (DE); Florian Schwagmeyer, Heuerssen (DE)

(73) Assignee: WABCO GmbH, Hannover (DE)

( * ) Notice: Subject to any disclaimer, the term of this patent is extended or adjusted under 35 U.S.C. 154(b) by 53 days.

(21) Appl. No.: 15/229,168

(22) Filed: Aug. 5, 2016

(65) Prior Publication Data
US 2017/0036655 A1    Feb. 9, 2017

(30) Foreign Application Priority Data

Aug. 7, 2015   (DE) .................. 10 2015 010 293

(51) Int. Cl.
| | |
|---|---|
| *B60T 8/58* | (2006.01) |
| *B60T 8/36* | (2006.01) |
| *B60T 13/68* | (2006.01) |
| *B60T 8/172* | (2006.01) |

(52) U.S. Cl.
CPC ............ *B60T 8/58* (2013.01); *B60T 8/172* (2013.01); *B60T 8/36* (2013.01); *B60T 13/683* (2013.01)

(58) Field of Classification Search
CPC ... B60T 8/36; B60T 8/58; B60T 8/172; B60T 8/683; B60T 8/686; B60T 8/176; B60T 8/175
See application file for complete search history.

(56) References Cited

U.S. PATENT DOCUMENTS

| | | | |
|---|---|---|---|
| 6,592,192 B1 * | 7/2003 | Kaneda | B60T 8/36 303/140 |
| 6,955,408 B1 | 10/2005 | Schmitt | |
| 2002/0096939 A1 | 7/2002 | Sakata et al. | |
| 2015/0274143 A1 * | 10/2015 | Miyazaki | B60T 8/348 303/9.61 |

FOREIGN PATENT DOCUMENTS

| | | |
|---|---|---|
| DE | 3729183 C2 | 11/1994 |
| DE | 10202514 A1 | 8/2002 |
| WO | WO 97/29001 A1 | 6/1997 |

* cited by examiner

*Primary Examiner* — Melanie Torres Williams
(74) *Attorney, Agent, or Firm* — Leydig, Voit & Mayer, Ltd.

(57) ABSTRACT

A method for the temperature-dependent control of a pressure control valve of a vehicle comprising an inlet valve and an outlet valve includes detecting a predefined pressure difference to be controlled by the pressure control valve, determining a present valve body temperature, wherein, for this purpose, a temperature change proceeding from a starting temperature is considered depending on at least one detected valve body influencing variable, determining, depending on the pressure difference to be controlled and on the determined present valve body temperature, at least one of a temperature-adjusted pulse duration for the inlet valve and a temperature-adjusted pulse duration for the outlet valve, and controlling at least one of the inlet valve and the outlet valve of the pressure control valve via the particular temperature-adjusted pulse duration in order to effectuate the detected pressure difference at the determined valve body temperature.

20 Claims, 2 Drawing Sheets

METHOD FOR THE TEMPERATURE-DEPENDENT CONTROL OF A PRESSURE CONTROL VALVE AND A CONTROL DEVICE THEREFORE

CROSS REFERENCE TO RELATED APPLICATIONS

This application claims benefit to German Patent Application No. DE 10 2015 010 293.1, filed Aug. 7, 2015, which is incorporated by reference herein.

FIELD

The present invention relates to a method for the temperature-dependent control of a pressure control valve, and to a control device for carrying out the method.

BACKGROUND

Pressure control valves are used, for example, as ABS control valves in an antilock braking system in order to enable a pressure difference to be set at the wheel brakes of a vehicle, in particular a commercial vehicle, as soon as a case of brake slip is detected. In this case, the pressure control valve or the ABS control valve comprises an inlet valve and an outlet valve, each of which is designed as a 2/2 directional solenoid valve. Depending on the control action, which takes place in a clocked or pulsed manner, the inlet valve or the outlet valve is in either an open or a closed state, and so, when controlled accordingly, a brake pressure can be increased, maintained, or reduced at the particular wheel brakes of a vehicle wheel.

An ABS control valve of this type can also be used, however, for regulating the brake pressure when a demanded brake pressure or a brake pressure difference is specified by any type of driver assistance system or by a stability control system, for example, a stability program (ESP), an adaptive cruise control (ACC), a rollover stability control (RSC), an emergency braking system (AEBS), an anti-slip regulation (ASR) or a yaw control (YC). Additionally or alternatively, in the event of driver braking, the brake pressure or a brake pressure difference can be specified at individual wheel brakes by a brake pressure distribution (EBD) or a brake force limitation (EBL) and can be controlled by the ABS control valve.

The control of the pressure control valve or the ABS control valve takes place in this case via a control device which controls, i.e., opens or closes, the inlet valve and/or the outlet valve for a certain pulse duration. In this case, the pulse duration determines the pressure difference which is set at the wheel brakes by the control, via the pulse duration. Depending on whether the outlet valve and/or the inlet valve are/is controlled, the brake pressure at the wheel brakes is therefore reduced or increased by the amount of the pressure difference, or the pressure is maintained, depending on the pulse duration. The correlation between the pulse duration and the pressure difference is based, both for the inlet valve and for the outlet valve in this case, on a previously empirically determined pressure difference characteristic curve which is determined in advance, in each case, for the corresponding ABS control valve.

The disadvantage thereof is that the particular pressure difference characteristic curve for the inlet valve or for the outlet valve is recorded at a certain temperature of 20° C., for example. The pressure difference characteristic curve is also temperature-dependent, however, due to the temperature dependence of sealing elements, lubricants, and other components of the ABS control valve, and so pressure differences controlled by the ABS control valve differ, for a fixed pulsed duration, at an ambient temperature of 20° C. and, for example, −20° C. As a result, a reliable braking according to the predefined pressure difference cannot be ensured at an ambient temperature that deviates from 20° C. In addition, the control action of a driver assistance system or a stability control system is therefore very sluggish and unreliable at very low temperatures, for example, of less than 0° C.

In order to take the temperature dependence into account in the control of the pressure control valve, it is provided in DE 37 29 183 C2 to measure a coil current at a measurement resistor, which coil current is flowing through the solenoid valve of the magnetically actuated pressure control valve. This coil current is a measure of the operating temperature of the valve, in particular of the temperature of the flow medium. A temperature is assigned to the measured coil current and, on the basis of the temperature, an adjusted pulse duration is determined, with which the pressure control valve is controlled. The disadvantage thereof is that the adjustment of the pulse duration carried out solely as a function of the temperature of the solenoid coil is not accurate, since the temperature of the solenoid coil resting on the outside of the pressure control valve does not correspond to the temperature of the valve body and, therefore, can vary according to external influences.

A further temperature-dependent adjustment is provided in WO97/29001. According thereto, the pulse duration is corrected depending on variables which influence dynamics of the pressure change, wherein the variables are, in particular, an ambient temperature, a hydraulic temperature, a supply voltage at the pump motor, or the pressure generated by the pump motor. In this case, the dynamics of the pressure change, i.e., the pressure build-up or the pressure decrease, are considered depending on the temperature which, according to the prior art, changes only as a result of the temperature of the pressure medium.

SUMMARY

In an embodiment, the present invention provides a method for the temperature-dependent control of a pressure control valve of a vehicle comprising an inlet valve and an outlet valve. The method includes detecting a predefined pressure difference to be controlled by the pressure control valve, determining a present valve body temperature, wherein, for this purpose, a temperature change proceeding from a starting temperature is considered depending on at least one detected valve body influencing variable, determining, depending on the pressure difference to be controlled and on the determined present valve body temperature, at least one of a temperature-adjusted pulse duration for the inlet valve and a temperature-adjusted pulse duration for the outlet valve, and controlling at least one of the inlet valve and the outlet valve of the pressure control valve via the particular temperature-adjusted pulse duration in order to effectuate the detected pressure difference at the determined valve body temperature.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
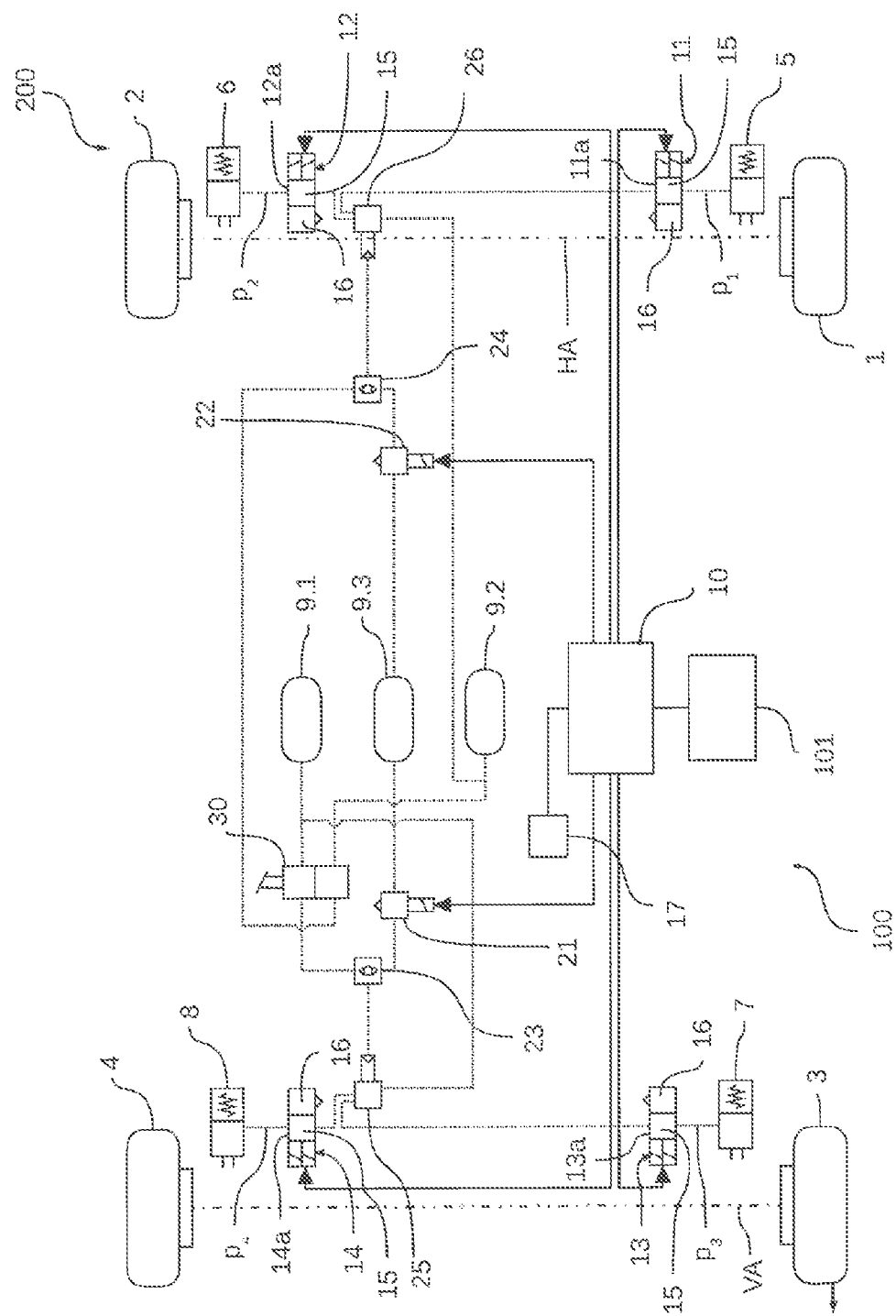
FIG. 1 shows a block diagram of a vehicle comprising an electronic brake system according to an embodiment of the invention.

An embodiment of the present invention provides a method for the temperature-dependent control of a pressure control valve, which ensures a reliable and safe braking response and a reliable control action in a driver assistance system or a stability control system at different temperatures. Another embodiment of the present invention is that of providing a control device for controlling the pressure control valve.

According to an embodiment of the invention, a pulse duration, with which a pressure control valve, for example, an ABS control valve, is to be controlled in order to effectuate a pressure difference at wheel brakes of a vehicle, preferably a commercial vehicle, is determined as a function of a valve body temperature. In this case, the valve body temperature indicates a present temperature of a valve body of the pressure control valve, wherein the valve body temperature is preferably determined on the basis of a temperature model.

The pressure difference is preferably specified either depending on a driver braking, i.e., for example, is specified by a brake force limitation (EBL) or a brake force distribution (EBD), or by a driver assistance system or a stability control system, for example an antilock brake system (ABS), a stability program (ESP), an adaptive cruise control (ACC), a rollover stability control (RSC), an emergency braking system (AEBS), an anti-slip regulation (ASR), or a yaw control (YC). Therefore, the pressure control valve does not set absolute pressure values, but rather a pressure difference, as a function of which the reaction by the vehicle is analyzed by the particular system and the pressure difference is adjusted, if necessary.

The conversion of the specified pressure difference into a corresponding pulse duration, within which the pressure control valve is controlled for a pressure change in order to effectuate the specified pressure difference, preferably takes place via two pressure difference characteristic curves, wherein a first pressure difference characteristic curve applies for a specified pressure difference in the direction of an increase in brake pressure, i.e., it applies for a control of the inlet valve, and a second pressure difference characteristic curve applies for a specified pressure difference in the direction of a reduction in the brake pressure, i.e., it is valid for a control of the outlet valve.

In this case, the two pressure difference characteristic curves are determined, for example, empirically in advance for the particular pressure control valve used and is stored in a control device, and so an unambiguous assignment of a pulse duration to a specified pressure difference is possible. The pulse duration in the case of an ABS control valve, for example, is the duration for which an inlet valve and/or an outlet valve of the ABS control valve are/is controlled for a pressure change, i.e., it is preferably the duration for which the inlet valve is opened in order to increase the brake pressure and/or the outlet valve is opened in order to reduce the brake pressure.

The pressure difference characteristic curves for the inlet valve and the outlet valve differ in this case depending on a present brake pressure which is supposed to be adjusted by way of the pressure difference. In the case of the outlet valve, if there is a large pressure differential between an atmospheric pressure and the present brake pressure, a lower pulse duration must be selected in order to effectuate a certain pressure difference. However, if there is a small pressure differential between the atmospheric pressure and the present brake pressure, then a higher pulse duration must be selected in order to effectuate the pressure difference. The same applies correspondingly for the inlet valve, in the case of which the pressure differential between the present brake pressure and the pressure in the pressure reservoir must be taken into account.

The particular pressure difference characteristic curve is empirically determined in advance at a fixed valve body temperature, for example, 20° C., and, therefore, is valid only at this valve body temperature. In order to obtain a dependence of the pulse duration for the inlet valve or for the outlet valve on the specified pressure difference for other valve body temperatures as well, it is provided according to an embodiment of the invention to also account for the valve body temperature determined using a corresponding temperature model for the valve body in the determination of the particular pulse duration.

As a result, the advantage can already be achieved that inaccuracies in the determination of the particular pulse duration for the inlet valve or for the outlet valve can be compensated by way of a deviation of the valve body temperature from the temperature at which the particular pressure difference characteristic curve was recorded. As a result, the specified pressure difference can be more accurately set. The influence of the temperature of the valve body on the inaccuracies in the determination of the pulse duration is very great in this case, since, in particular, sealing elements, lubricants, and other components close to the valve body have an influence on the pressure control, and so safe and reliable braking or a reliable control action can take place by adjusting the particular pulse duration depending on this valve body temperature.

In order to determine the particular temperature-dependent pulse duration, it can be provided according to an embodiment that pressure difference characteristic curves are empirically determined in advance both for the outlet valve and for the inlet valve, for different valve body temperatures, and are stored in the control device. A suitable pressure difference characteristic curve assigned to the inlet valve or the outlet valve must therefore be selected for the particular valve body temperature, from which the particular pulse duration is then derived, being adjusted for the temperature, for the inlet valve and for the outlet valve at a specified pressure difference.

According to a further advantageous embodiment, only one pressure difference characteristic curve each for the outlet valve and for the inlet valve, which has been determined at a fixed valve body temperature, is used. On the basis of this particular pressure difference characteristic curve, a pulse duration corresponding to the specified pressure difference is determined for the inlet valve and the outlet valve. In order to adjust the particular pulse duration with respect to the actually present valve body temperature, either the pulse duration determined from the particular pressure difference characteristic curve can have added thereto a temperature-dependent offset pulse duration and/or can be multiplied by a temperature-dependent pulse duration factor in order to obtain a temperature-adjusted pulse duration in each case. In this case, the offset pulse duration and the pulse duration factor can be empirically determined in advance for the pressure difference characteristic curve of the inlet valve and for the pressure difference characteristic curve of the outlet valve, and can be stored in the control device.

The determination of the valve body temperature on the basis of the temperature model is provided, according to an embodiment of the invention, as follows. Proceeding from a starting temperature of the valve body, a temperature change of the valve body temperature is considered in terms of at least one valve body influencing variable. In an embodiment of the invention, a valve body influencing variable is considered to be a variable which influences the valve body temperature. The starting temperature can be, for example, the most recently determined valve body temperature or an ambient temperature which can be transmitted to the control device, for example, via a CAN bus of the vehicle. The ambient temperature can also be determined, however, by the control unit via a temperature sensor. In this case, the ambient temperature can be assumed to be the starting temperature in particular when the vehicle or the pressure control valve has not been actuated for a relatively long time period and it can therefore be assumed that the valve body temperature has dropped to the ambient temperature. For this purpose, an exponential drop in the valve body temperature over time can be assumed, wherein the calculation can take place in the control unit even in a vehicle in which the ignition is shut off or, when the vehicle is started up, after the ignition has been switched on and with consideration for the time during which the vehicle was not operating.

The most recently determined valve body temperature can be used as the starting temperature in order to allow for the determination of the valve body temperature during the operation of the brake system throughout any number of control actions, i.e., actuations and non-actuations of the pressure control valve, i.e., for any number of brakings and non-brakings, all of which influence the valve body temperature.

The valve body influencing variable can be, for example, the ambient temperature, an actuation time of the pressure control valve or, in the case of an ABS control valve, the actuation time of the inlet valve and/or the outlet valve, a non-actuation time of a pressure control valve or, in the case of an ABS control valve, the non-actuation time of the inlet valve and/or the outlet valve, a ground speed of the vehicle, an installation location of the pressure control valve, a control voltage for controlling the pressure control valve, a mass of the valve body, and a material property of the valve body. All these variables have an influence on the valve body temperature and can be combined with one another in any way:

If the pressure control valve, for example, the inlet valve and/or the outlet valve, is actuated via a control action within one pulse duration, then, in the case of a magnetic pressure control valve, the coils through which current flows heat up the valve body, wherein the temperature change is dependent on the actuating time. In the case of non-actuation, the valve body temperature therefore lowers again and does not match the ambient temperature. Depending on the ground speed, the circulating wind of the vehicle's own speed, which is flowing around the valve body, can additionally cool the valve body. The influence of adjacent components—which may heat or cool—in the vehicle, or the effect of sun and wind, including the wind of the vehicle's own speed, on the pressure control valve can also change, depending on the installation location. The material and the mass of the valve body influence, in particular, a heat conductivity and, therefore, the property of the valve body to absorb and store energy or heat, and to release it again.

In order to allow for a determination of the temperature change in the valve body temperature depending on these valve body influencing variables, a temperature characteristic curve for each valve body influencing variable can be stored in the control device. In this way, the temperature change in the valve body temperature proceeding from the starting temperature can be indicated as a function of an actuating time of the pressure control valve in a temperature characteristic curve, for example, and so, by reference thereto, a temperature change in the valve body temperature can be determined when the pressure control valve is actuated for any pulse duration. In a further temperature characteristic curve, the temperature change in the valve body temperature proceeding from the starting temperature can be indicated as a function of the measured ambient temperature which compensates the valve body temperature again, to a certain extent, which was changed via the control of the pressure control valve. Therefore, multiple valve body influencing variables can be determined in parallel and correlated with one another, for example, via an addition of the particular temperature changes of the valve body temperature, in order to obtain an actually present valve body temperature.

It is therefore possible to achieve the advantage of accounting for as many influencing variables as possible in the determination of the valve body temperature, and so an accurate determination of the valve body temperature is possible and, therefore, so is a preferably accurate determination of the particular pulse durations for effectuating the controlled pressure difference.

After any time period, a validation of the valve body temperature can advantageously take place by way of determining, for example, an electrical resistance of the coils of the magnetic pressure control valve, on the basis of which the approximate valve body temperature is derived. The ambient temperature can also be utilized. As a result, systematically occurring errors caused by a defect can be detected and avoided.

FIG. 1 shows a vehicle 100 comprising an electronic brake system 200 having the components which are relevant here. According thereto, rear wheels 1, 2 are provided on a rear axle HA and front wheels 3, 4 are provided on a front axle VA, each of which can be braked using wheel brakes 5, 6, 7, 8, respectively, wherein a brake pressure $p_1$, $p_2$, $p_3$, $p_4$ is provided at the particular wheel brakes 5, 6, 7, 8, which brake pressure is provided by pressure reservoirs 9.1, 9.2 for the corresponding brake circuit, is controlled by a brake valve 30 and relay valves 25, 26, and is set by ABS control valves 11, 12, 13, 14 designed as pressure control valves.

Each ABS control valve 11, 12, 13, 14 comprises an inlet valve 15 and an outlet valve 16, each of which is designed as a 2/2 directional solenoid valve and, depending on the control action carried out by a control device 10, can be transferred into an open position or into a closed position, and so a brake pressure $p_1$, $p_2$, $p_3$, $p_4$ at the wheel brake 5, 6, 7, 8, respectively, can be maintained, increased or lowered by way of the ABS control valve 11, 12, 13, 14. The ABS control valve 11, 12, 13, 14 comprises a valve body 11a, 12a, 13a, 14a, respectively, which encloses the inlet valve 15 and the outlet valve 16.

The ABS control valves 11, 12, 13, 14 are controlled by the control device 10 which controls the particular ABS control valve 11, 12, 13, 14, preferably in a pulsed manner, depending on a demanded pressure difference $\Delta p_1$, $\Delta p_2$, $\Delta p_3$, $\Delta p_4$, respectively. In this case, the demanded pressure difference $\Delta p_1$, $\Delta p_2$, $\Delta p_3$, $\Delta p_4$ can be specified by any type of driver assistance system or stability control system, for example, an antilock brake system (ABS), a stability program (ESP), an adaptive cruise control (ACC), a rollover stability control (RSC), an emergency braking system (AEBS), an anti-slip regulation (ASR), or a yaw control (YC), or depending on a driver braking, for example, being specified by a brake force limitation (EBL) or a brake force distribution (EBD). For this purpose, the demanded pressure difference $\Delta p_1$, $\Delta p_2$, $\Delta p_3$, $\Delta p_4$ is either transmitted by an external control device 101 of the corresponding system to the control unit 10, for example, via a CAN bus, or the corresponding system is integrated in the control unit 10.

In order to ensure that the pressure difference $\Delta p_1$, $\Delta p_2$, $\Delta p_3$, $\Delta p_4$ demanded by the particular driver assistance system or stability control system can be set, the control device 10 first controls a 3/2 directional valve 21 for the wheel brakes 7, 8 of the front axle VA or a 3/2 directional valve 22 for the wheel brakes 5, 6 of the rear axle HA, which valves are connected to a further pressure reservoir 9.3. The 3/2 directional valves 21, 22 are connected via a non-return valve 23, 24, respectively, to a relay valve 25, 26, respectively, for the vehicle axle VA, HA, respectively. When the 3/2 directional valves 21, 22 are controlled accordingly, a pressure, which may be provided by the brake valve 30, can therefore be increased by way of releasing the connection between the pressure reservoirs 9.1, 9.2 and the ABS control valves 11, 12, 13, 14 via the relay valves 25, 26. Therefore, a brake pressure $p_1$, $p_2$, $p_3$, $p_4$ at the front or rear wheel brakes 5, 6, 7, 8 can also be increased via the ABS control valves 11, 12, 13, 14 in order to satisfy a demanded pressure difference $\Delta p_1$, $\Delta p_2$, $\Delta p_3$, $\Delta p_4$ in the direction of an increase in the brake pressure $p_1$, $p_2$, $p_3$, $p_4$. Likewise, a brake pressure $p_1$, $p_2$, $p_3$, $p_4$ at the front or rear wheel brakes 5, 6, 7, 8 can be reduced via the ABS control valves 11, 12, 13, 14, even below a pressure which may be provided by the brake valve 30, in order to satisfy a demanded pressure difference $\Delta p_1$, $\Delta p_2$, $\Delta p_3$, $\Delta p_4$ in the direction of a reduction in the brake pressure $p_1$, $p_2$, $p_3$, $p_4$.

In order to determine a pulse duration $\Delta t_1$, $\Delta t_2$ on the basis of the demanded pressure difference $\Delta p_1$, $\Delta p_2$, $\Delta p_3$, $\Delta p_4$, within which the inlet valve 15 or the outlet valve 16 of the corresponding ABS control valve 11, 12, 13, 14 must be controlled in a pulsed manner in order to effectuate the pressure difference $\Delta p_1$, $\Delta p_2$, $\Delta p_3$, $\Delta p_4$, reference is made to a first pressure difference characteristic curve $K_1$ for the inlet valve 15 stored in the control unit 10 in the case of a demanded pressure difference $\Delta p_1$, $\Delta p_2$, $\Delta p_3$, $\Delta p_4$ in the direction of an increase in the brake pressure $\Delta p_1$, $\Delta p_2$, $\Delta p_3$, $\Delta p_4$, and, in the case of a demanded pressure difference $\Delta p_1$, $\Delta p_2$, $\Delta p_3$, $\Delta p_4$ in the direction of a reduction in the brake pressure $\Delta p_1$, $\Delta p_2$, $\Delta p_3$, $\Delta p_4$, reference is made to a second pressure difference characteristic curve $K_2$ for the outlet valve 16. These characteristic curves describe a previously empirically determined dependence of the particular pulse duration $\Delta t_1$, $\Delta t_2$ on the demanded pressure difference $\Delta p_1$, $\Delta p_2$, $\Delta p_3$, $\Delta p_4$. In this case, each of these pressure difference characteristic curves $K_1$, $K_2$ is valid for a specified valve body temperature $T_V$. In order to also achieve a dependence of the particular pulse duration $\Delta t_1$, $\Delta t_2$ on the demanded pressure difference $\Delta p_1$, $\Delta p_2$, $\Delta p_3$, $\Delta p_4$ to be controlled for any other valve body temperature $T_V$, an adjustment of the pulse duration $\Delta t_1$, $\Delta t_2$ determined on the basis of the pressure difference characteristic curve, $K_1$, $K_2$, respectively, takes place in the control device 10.

For this purpose, a valve body temperature $T_V$ for the valve body 11a, 12a, 13a, 14a of the respective ABS control valve 11, 12, 13, 14 to be controlled is first determined in the control unit 10 according to a temperature model. For this purpose, a starting temperature $T_A$ is determined, which, for example, after a relatively long non-actuation of the corresponding ABS control valve 11, 12, 13, 14 or of the inlet and/or outlet valves 15, 16, is derived from an ambient temperature $T_U$ which can be communicated to the control unit 10 via the CAN bus or which can be measured by a temperature sensor 17 connected to the control device 10. However, the starting temperature $T_A$ can also be the valve body temperature $T_V$ determined most recently via the temperature model, optionally with consideration for a cooling by the ambient temperature $T_U$. In order to obtain the present valve body temperature $T_V$, a temperature change $\Delta T$ proceeding from the starting temperature $T_A$ caused by a valve body influencing variable is considered.

In this case, a valve body influencing variable of this type is, for example, an actuating time $t_B$ within which, for example, current flows through coils in the inlet and/or outlet valves 15, 16, whereby the valve body 11a, 12a, 13a, 14a enclosing the inlet valve 15 or the outlet valve 16 is heated, wherein this can be additionally dependent on a voltage V with which the coils of the inlet or outlet valves 15, 16 are controlled. The valve body 11a, 12a, 13a, 14a cools down again during a non-actuating time $t_{NB}$, wherein this cooling can take place in an exponentially decreasing manner, for example, and, in this case, can be dependent, in particular, on the ambient temperature $T_U$ and an installation location O of the ABS control valve 11, 12, 13, 14. If the ABS control valve 11, 12, 13, 14 is installed in a protected position in the vehicle 100, it is cooled down to a lesser extent, for example, by the wind of the vehicle's own speed, which is dependent on a vehicle speed $v_F$, than in a position in the vehicle 100 exposed to the wind of the vehicle's own speed. Further valve body influencing variables are, for example, a mass m and/or a material property B of the valve body 11a, 12a, 13a, 14a, which determine a heat conductivity k, in particular, and therefore the property of the valve body 11a, 12a, 13a, 14a to compensate, again, the temperature increase resulting from a control.

The actuating and non-actuating time $t_B$ and $t_{NB}$, respectively, can be determined directly by the control device 10 which controls the ABS control valve 11, 12, 13, 14 to which this information is therefore provided. On the basis of the vehicle speed $v_F$, an influence by the wind of the vehicle's own speed can be estimated, in the control device 10, as a function of the installation location O, wherein the installation location can be stored in the control device 10. Likewise, the mass m and the material property B can be stored in the control device 10 in advance.

The present valve body temperature $T_V$ therefore results from $T_V = T_A + \Delta T(T_U, t_B, t_{NB}, m, B, k, v_F)$, wherein different valve body influencing variables can also be correlated in the temperature change $\Delta T$, for example, the influence of the wind of the vehicle's own speed as a function of the vehicle speed $v_F$ accompanied by simultaneous warming of the ABS control valve 11, 12, 13, 14 by way of a control for an actuating time $t_B$.

The temperature change $\Delta T$ in this case takes place, for example, on the basis of temperature characteristic curves $K_T$ which can be stored in the control device 10 for each valve body influencing variable $T_U$, $t_B$, $t_{NB}$, O, m, B, k, $v_F$, and so, depending on the trip and the braking situation, a temperature change $\Delta T$ can be assigned to each valve body influencing variable $T_U$, $t_B$, $t_{NB}$, m, B, k, $v_F$.

Depending on the valve body temperature $T_V$ which is therefore determined, the pulse duration $\Delta t_1$, $\Delta t_2$ determined on the basis of the particular pressure difference characteristic curve $K_1$, $K_2$ is adjusted by way of either a temperature-dependent offset pulse duration $t_{Off}(T_V)$ being added and/or by way of the particular pulse duration $\Delta t_1$, $\Delta t_2$ being multiplied by a temperature-dependent pulse duration factor $F_P(T_V)$, i.e., a temperature-adjusted pulse duration $\Delta t_{1a}$, $\Delta t_{2a}$, results, for example, from $\Delta t_{1a,\ 2a} = \Delta t_{1,\ 2} \times F_P(T_V)$ or $\Delta t_{1a,\ 2a} = \Delta t_{1,\ 2} + t_{Off}(T_V)$. Implementing the particular temperature-adjusted pulse duration $\Delta t_{1a}$, $\Delta t_{2a}$, the control unit 10 then controls the inlet or outlet valve 15, 16 of the corresponding ABS control valve 11, 12, 13, 14 in order to control a correspondingly demanded pressure difference $\Delta p_1$, $\Delta p_2$, $\Delta p_3$, $\Delta p_4$, at the valve body temperature $T_V$ determined via the temperature model, at the corresponding wheel brake 5, 6, 7, 8, in order to satisfy either a driver request and/or a demand from the corresponding driver assistance system or the stability control system.

In addition, a validation of the calculated valve body temperature $T_V$ can be carried out via comparison with the ambient temperature $T_U$ or a valve body temperature $V^R{}_T$ calculated on the basis of a coil resistance R of the 2/2 solenoid valves 15, 16.

Figure 2:
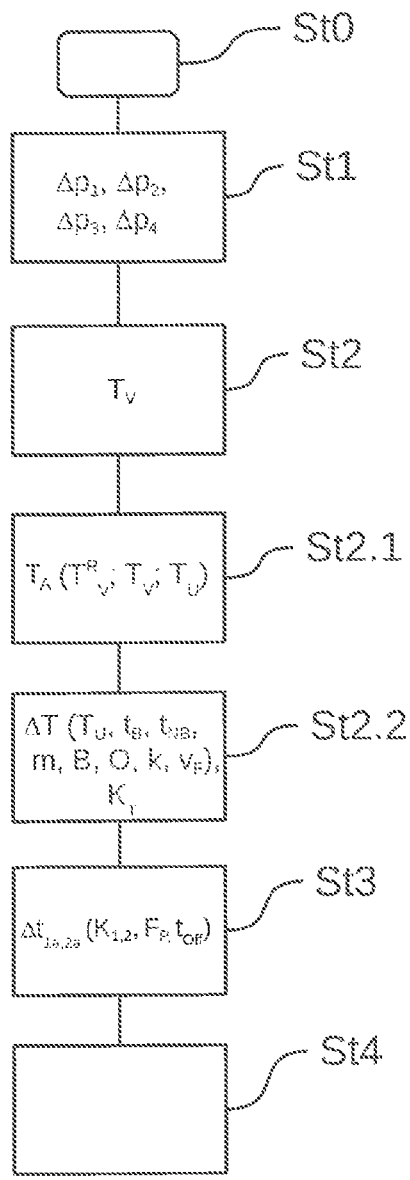
FIG. 2 shows a flow chart of a method according to an embodiment of the invention.

The method for the temperature-dependent control of an ABS control valve 11, 12, 13, 14 can be carried out, according to FIG. 2, as follows:

In a step St0, the method starts when a braking demand is detected, by way of which a pressure difference $\Delta p_1$, $\Delta p_2$, $\Delta p_3$, $\Delta p_4$ at the wheel brakes 5, 6, 7, 8 is demanded.

In a first step St1, first, the pressure difference $\Delta p_1$, $\Delta p_2$, $\Delta p_3$, $\Delta p_4$ to be controlled by the ABS control valve 11, 12, 13, 14 is detected, which pressure difference is output, for example, by the driver assistance system or the stability control system.

In a following step St2, a valve body temperature $T_V$, which is present at the time of the demand for the pressure difference $\Delta p_1$, $\Delta p_2$, $\Delta p_3$, $\Delta p_4$, is determined. For this purpose, in a step St2.1, first, a starting temperature $T_A$ is ascertained and, on the basis thereof, in a step St2.2, a temperature change $\Delta T$ proceeding from the starting temperature $T_A$ is determined as a function of the valve body influencing variables $T_U$, $t_B$, $t_{NB}$, m, B, O, k, $v_F$.

In this case, the temperature change $\Delta T$ proceeding from the starting temperature $T_A$ in the time period between the determination of the starting temperature $T_A$ and the point in time of the present request is considered. In this case, it is possible for the starting temperature $T_A$ to have been determined, for example, upon actuation of the ignition or during the most recent braking demand. Within this time, the valve body temperature $T_V$ can have increased or decreased, in particular due to the valve body influencing variables $T_U$, $t_B$, $t_{NB}$, O, m, B, k, $v_F$, or they may have remained the same. This is calculated in the control device 10 according to a temperature model, and a present valve body temperature $T_V$ is determined.

On the basis of the calculated valve body temperature $T_V$, in a step St3, a particular temperature-adjusted pulse duration $\Delta t_{1a}$, $\Delta t_2 a$ is determined on the basis of the demanded pressure difference $\Delta p_1$, $\Delta p_2$, $\Delta p_3$, $\Delta p_4$ depending on the particular pressure difference characteristic curve $K_1$, $K_2$ and the pulse duration factor $F_P$ and/or the offset pulse duration $t_{Off}$.

Implementing these particular temperature-adjusted pulse durations $\Delta t_{1a}$, $\Delta t_{2a}$, in a step St4, the inlet or outlet valve 15, 16 of the corresponding ABS control valve 11, 12, 13, 14 is subsequently controlled in order to effectuate the demanded pressure difference $\Delta p_1$, $\Delta p_2$, $\Delta p_3$, $\Delta p_4$.

Starting at this point, the method begins from the beginning, wherein the presently determined valve body temperature $T_V$ can be used as the starting temperature $T_A$ for the next triggering pulse.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS
(COMPONENT OF THE DESCRIPTION)

1, 2 Rear wheels
3, 4 Front wheels
5, 6 Rear wheel brakes
7, 8 Front wheel brakes
9.1, 9.2, 9.3 Pressure reservoir
10 Control unit
11, 12 ABS brake valves for rear wheel brakes 5, 6
11, 12a Valve bodies of 11, 12
13, 14 ABS brake valves for front brakes 7, 8
13a, 14a Valve bodies of 13, 14
15 Inlet valve
16 Outlet valve
17 Temperature sensor
21, 22 3/2 directional control valve
23, 24 Non-return valve
25, 26 Relay valve
30 Brake valve
100 Vehicle
101 External control device
200 Brake system
B Material property of the valve body
$F_P$ Pulse duration factor
HA Rear axle
$K_1$, $K_2$ Pressure difference characteristic curve
$K_T$ Temperature characteristic curve
m Mass of the valve body O Installation location
$p_1, p_2, p_3, p_4$ Brake pressure for wheel brakes 5, 6, 7, 8
$\Delta p_1, \Delta p_2, \Delta p_3, \Delta p_4$ Pressure difference
R Coil resistance
$\Delta t_1, \Delta t_2$ Pulse duration
$\Delta t_{1a}, \Delta t_{2a}$ Temperature-adjusted pulse duration
$t_B$ Actuating time
$t_{NB}$ Non-actuating time
$t_{Off}$ Offset pulse duration
$\Delta T$ Temperature change
$T_A$ Starting temperature
$T_V$ Valve body temperature
$T^R_V$ Valve body temperature based on coil resistance R
$T_U$ Ambient temperature
V Voltage
VA Front axle
$v_F$ Vehicle speed
St0, St1, St2, St2.1, St2.2, St3, St4 Steps of the method

The invention claimed is:

1. A method for the temperature-dependent control of a pressure control valve of a vehicle comprising an inlet valve and an outlet valve, the method comprising:
   detecting a pressure difference to be controlled by the pressure control valve;
   determining a present valve body temperature, wherein, for this purpose, a temperature change proceeding from a starting temperature is considered depending on at least one detected valve body influencing variable;
   determining, depending on the pressure difference to be controlled and on the determined present valve body temperature, at least one of a temperature-adjusted pulse duration for the inlet valve and a temperature-adjusted pulse duration for the outlet valve; and
   controlling at least one of the inlet valve and the outlet valve of the pressure control valve via the particular temperature-adjusted pulse duration in order to effectuate the detected pressure difference at the determined valve body temperature,
   wherein the valve body influencing variable is at least one of an actuating time and a non-actuating time of the pressure control valve, and
   wherein the pressure control valve is controlled in a clocked manner during the actuating time and is not controlled during the non-actuating time.

2. The method as claimed in claim 1, wherein in order to determine at least one of the temperature-adjusted pulse duration for the inlet valve and the temperature-adjusted pulse duration for the outlet valve, an initial pulse duration is first determined on the basis of a pressure difference characteristic curve assigned to at least one of the inlet valve and the outlet valve,
   wherein the pressure difference characteristic curve indicates the dependence of the initial pulse duration on the pressure difference to be controlled for at least one of the inlet valve and the outlet valve, and
   wherein the initial pulse duration determined therefrom is adjusted depending on the temperature change.

3. The method according to claim 2, wherein the at least one of the temperature-adjusted pulse duration for the inlet valve and the temperature-adjusted pulse duration for the outlet valve is determined on the basis of the initial pulse duration determined via the pressure difference characteristic curve via at least one of addition of an offset pulse duration dependent on the determined present valve body temperature and multiplication by a pulse duration factor dependent on the determined present valve body temperature.

4. The method as claimed in claim 1, wherein the at least one of the temperature-adjusted pulse duration for the inlet valve and the temperature-adjusted pulse duration for the outlet valve is determined on the basis of a pressure difference characteristic curve, which is assigned to the determined present valve body temperature, for the inlet valve or the outlet valve, wherein the pressure difference characteristic curve indicates the dependence of a particular pulse duration on the pressure difference to be controlled, with respect to the determined present valve body temperature.

5. The method as claimed in claim 1, wherein the temperature change is determined depending on the detected valve body influencing variable on the basis of a temperature characteristic curve, wherein the temperature characteristic curve indicates the dependence of the temperature change on the at least one detected valve body influencing variable.

6. The method as claimed in claim 5, wherein the temperature characteristic curve is dependent upon a valve body of the corresponding pressure control valve and is stored in a control device in advance.

7. The method as claimed in claim 1, wherein a previously determined valve body temperature, an ambient temperature, or a valve body temperature calculated on the basis of a coil resistance is used as the starting temperature.

8. The method as claimed in claim 1, wherein the valve body influencing variable further indicates at least one of an installation location, an effect of the wind of the vehicle's own speed as a function of a vehicle speed, a mass or a material property of a valve body, a heat conductivity, and an ambient temperature.

9. The method as claimed in claim 1, wherein the determined present valve body temperature is validated by way of at least one of an ambient temperature and a valve body temperature calculated on the basis of a coil resistance.

10. The method as claimed in claim 1, wherein the pressure difference is specified by at least one of a brake force limitation, a brake force distribution, an antilock brake system, a stability program, an adaptive cruise control, a rollover stability control, an emergency braking system, an anti-slip regulation, and a yaw control.

11. The method as claimed in claim 1, wherein the temperature-dependent control is carried out on an ABS control valve.

12. A control device of a vehicle for controlling a pressure control valve comprising an inlet valve and an outlet valve, the control device being configured to:
   detecting a pressure difference to be controlled by the pressure control valve;
   determining a present valve body temperature, wherein, for this purpose, a temperature change proceeding from a starting temperature can be determined depending on at least one detected valve body influencing variable;
   determining, depending on the pressure difference to be controlled and on the determined present valve body temperature, at least one of a temperature-adjusted pulse duration for the inlet valve and a temperature-adjusted pulse duration for the outlet valve; and
   controlling at least one of the inlet valve and the outlet valve of the pressure control valve via the particular temperature-adjusted pulse duration in order to effectuate the pressure difference at the determined valve body temperature,
   wherein the valve body influencing variable is at least one of an actuating time and a non-actuating time of the pressure control valve, and wherein the pressure control valve is controlled in a clocked manner during the actuating time and is not controlled during the non-actuating time.

13. A vehicle comprising the control device as claimed in claim 12.

14. A method for the temperature-dependent control of a pressure control valve of a vehicle comprising an inlet valve and an outlet valve, the method comprising:
   detecting a pressure difference to be controlled by the pressure control valve;
   determining a present valve body temperature, wherein, for this purpose, a temperature change proceeding from a starting temperature is considered depending on at least one detected valve body influencing variable;
   determining, depending on the pressure difference to be controlled and on the determined present valve body temperature, at least one of a temperature-adjusted pulse duration for the inlet valve and a temperature-adjusted pulse duration for the outlet valve; and
   controlling at least one of the inlet valve and the outlet valve of the pressure control valve via the particular temperature-adjusted pulse duration in order to effectuate the detected pressure difference at the determined valve body temperature,
   wherein a previously determined valve body temperature, an ambient temperature, or a valve body temperature calculated on the basis of a coil resistance is used as the starting temperature.

15. The method as claimed in claim 14, wherein in order to determine at least one of the temperature-adjusted pulse duration for the inlet valve and the temperature-adjusted pulse duration for the outlet valve, an initial pulse duration is first determined on the basis of a pressure difference characteristic curve assigned to at least one of the inlet valve and the outlet valve,
   wherein the pressure difference characteristic curve indicates the dependence of the initial pulse duration on the pressure difference to be controlled for at least one of the inlet valve and the outlet valve, and
   wherein the initial pulse duration determined therefrom is adjusted depending on the temperature change.

16. The method as recited in claim 15, wherein the at least one of the temperature-adjusted pulse duration for the inlet valve and the temperature-adjusted pulse duration for the outlet valve is determined on the basis of the initial pulse duration determined via the pressure difference characteristic curve via at least one of addition of an offset pulse duration dependent on the determined present valve body temperature and multiplication by a pulse duration factor dependent on the determined present valve body temperature.

17. The method as recited in claim 14, wherein the temperature change is determined depending on the detected valve body influencing variable on the basis of a temperature characteristic curve, wherein the temperature characteristic curve indicates the dependence of the temperature change on the at least one detected valve body influencing variable.

18. The method as recited in claim 17, wherein the temperature characteristic curve is dependent upon a valve body of the corresponding pressure control valve and is stored in a control device in advance.

19. The method as recited in claim 14, wherein the pressure difference is specified by at least one of a brake force limitation, a brake force distribution, an antilock brake system, a stability program, an adaptive cruise control, a rollover stability control, an emergency braking system, an anti-slip regulation, and a yaw control.

20. A method for the temperature-dependent control of a pressure control valve of a vehicle comprising an inlet valve and an outlet valve, the method comprising:
   detecting a pressure difference to be controlled by the pressure control valve;
   determining a present valve body temperature, wherein, for this purpose, a temperature change proceeding from a starting temperature is considered depending on at least one detected valve body influencing variable;
   determining, depending on the pressure difference to be controlled and on the determined present valve body temperature, at least one of a temperature-adjusted pulse duration for the inlet valve and a temperature-adjusted pulse duration for the outlet valve; and
   controlling at least one of the inlet valve and the outlet valve of the pressure control valve via the particular temperature-adjusted pulse duration in order to effectuate the detected pressure difference at the determined valve body temperature,
   wherein in order to determine at least one of the temperature-adjusted pulse duration for the inlet valve and the temperature-adjusted pulse duration for the outlet valve, an initial pulse duration is first determined on the basis of a pressure difference characteristic curve assigned to at least one of the inlet valve and the outlet valve,
   wherein the pressure difference characteristic curve indicates the dependence of the initial pulse duration on the pressure difference to be controlled for at least one of the inlet valve and the outlet valve,
   wherein the initial pulse duration determined therefrom is adjusted depending on the temperature change, and
   wherein the at least one of the temperature-adjusted pulse duration for the inlet valve and the temperature-adjusted pulse duration for the outlet valve is determined on the basis of the initial pulse duration determined via the pressure difference characteristic curve via at least one of addition of an offset pulse duration dependent on the determined present valve body temperature and multiplication by a pulse duration factor dependent on the determined present valve body temperature.

* * * * *